United States Patent
Skipor et al.

(10) Patent No.: US 8,264,777 B2
(45) Date of Patent: Sep. 11, 2012

(54) PORTABLE ELECTRONIC DEVICE HAVING AN ELECTRO WETTING DISPLAY ILLUMINATED BY QUANTUM DOTS

(75) Inventors: Andrew F. Skipor, West Chicago, IL (US); Marc K. Chason, Schaumburg, IL (US); William F. Hoffman, Palatine, IL (US); Krishna Kalyanasundaram, Roseville, CA (US); George T. Valliath, Winnetka, IL (US)

(73) Assignee: QD Vision, Inc., Lexington, MA (US)

( * ) Notice: Subject to any disclaimer, the term of this patent is extended or adjusted under 35 U.S.C. 154(b) by 1344 days.

(21) Appl. No.: 11/768,363

(22) Filed: Jun. 26, 2007

(65) Prior Publication Data
US 2009/0002806 A1 Jan. 1, 2009

(51) Int. Cl.
G02B 1/06 (2006.01)
G02B 3/12 (2006.01)
(52) U.S. Cl. .......................... 359/665; 359/666
(58) Field of Classification Search .................. 359/665, 359/666
See application file for complete search history.

(56) References Cited

U.S. PATENT DOCUMENTS
7,123,796 B2 10/2006 Steckl et al.
2009/0046082 A1* 2/2009 Jacobson et al. ............... 345/204

FOREIGN PATENT DOCUMENTS
JP 1999-354842 A 12/1999
KR 10-2002-0050014 A 6/2002
KR 10-2006-0100151 A 9/2006
KR 10-0646810 B1 11/2006
WO 2006-000945 A1 1/2006
WO 2007-064141 A1 6/2007

OTHER PUBLICATIONS

Heikenfeld, J., et al, Intense switchable fluorescence in light wave coupled electrowetting devices, Applied Physics Letters 86, 011105 (2005).
Heikenfeld, J., et al, High-transmission electrowetting light valves, Applied Physics Letters 86, 151121 (2005).
Moeller, G., et al. Quantum-Dot Light-Emitting Devices for Displays, Information Display, Feb. 2006.
Beni, G., et al., Electro-wetting displays, Appl. Phys. Lett. 38 (4) Feb. 15, 1981, pp. 207-209.

(Continued)

Primary Examiner — William Choi

(57) ABSTRACT

A portable electronic device (510) having a self illuminating display (200, 202, 204, 206, 300, 512) that reduces both the thickness of known displays and processing steps in the fabrication thereof is provided. The portable electronic device (510) includes an electrowetting display (200, 202, 204, 206, 300, 512) having a plurality of transparent layers defining a cavity (219). A combination of a first fluid (218, 236) and a second fluid (210, 234, 244, 254) are positioned in the cavity. First circuitry (224) is configured to be coupled to a first voltage source (222) for selectively repositioning the second fluid (210, 234, 244, 254) in relation to the first fluid (218, 236). A plurality of quantum dots (208, 360) is positioned within the second fluid (210, 234, 244, 254), and a light source (209, 309) is disposed contiguous to the plurality of layers. Second circuitry (228) is configured to be coupled to a second voltage source (226) for selectively causing the light source (209, 309) to emit photons to strike the plurality of quantum dots (208, 360). Additional similar stacks of layers (204, 206) may be added to provide a color display.

23 Claims, 5 Drawing Sheets

OTHER PUBLICATIONS

Coe, S., et al. Electroluminescence from single monolayer of nanocrystals in molecular organic devices, Nature, vol. 420, Dec. 19-26, 2002.

Coe-Sullivan, S.,et al, Large-Area Ordered Quantum-Dot Monolayers via Phase Separation During Spin-Casting, Adv. Funct. Mater. 2005, 15, 1117-1124.

Prins, M.W.J., et al., Fluid Control in Multichannel Structures by Electrocapillary Pressure, Science, New Series, vol. 291, No. 5502 (Jan. 12, 2001), pp. 277-280.

Heikenfeld, J., et al, Electrowetting Light Valves with Greater than 80% Transmission, Unlimited View Angle, and Video Response, SID 05 Digest.

Hayes, R., et al. Video-speed electronic paper based on electrowetting, Nature, vol. 425, Sep. 25, 2003 pp. 383-385.

Chang Rag Choi, "PCT International Search Report and Written Opinion," WIPO, ISA/KR, Korean Intellectual Property Office, Daejeon, Republic of Korea, Dec. 23, 2008.

* cited by examiner

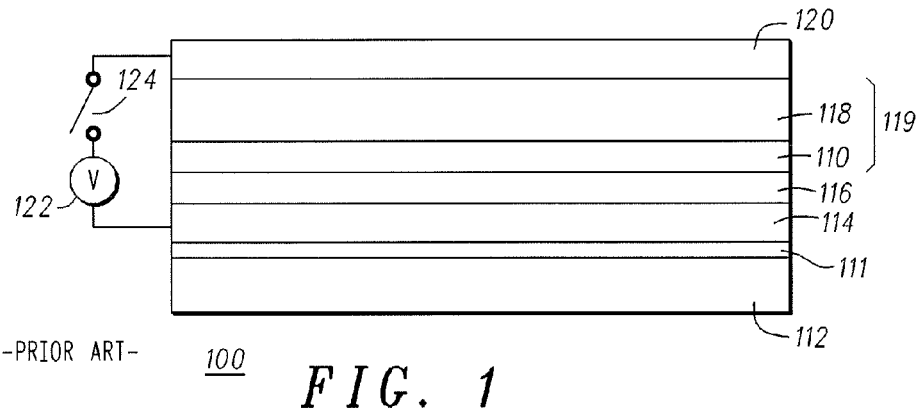
FIG. 1 -PRIOR ART-
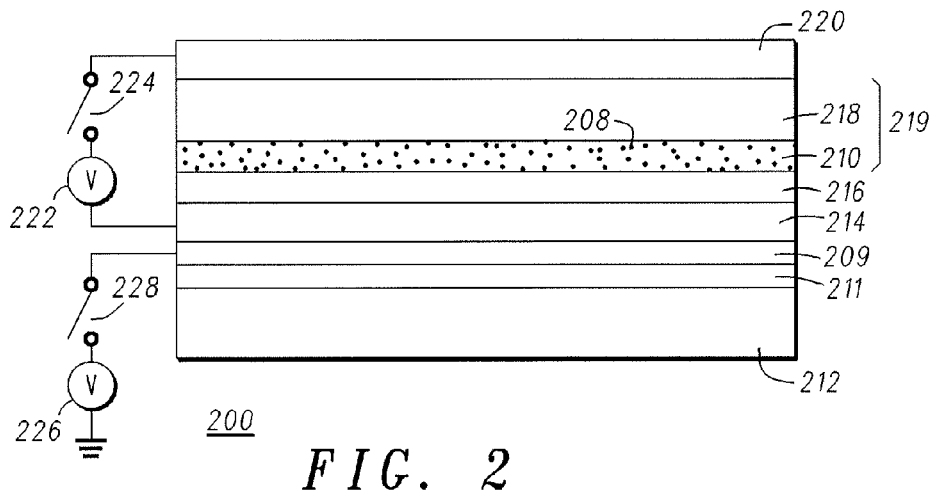
FIG. 2
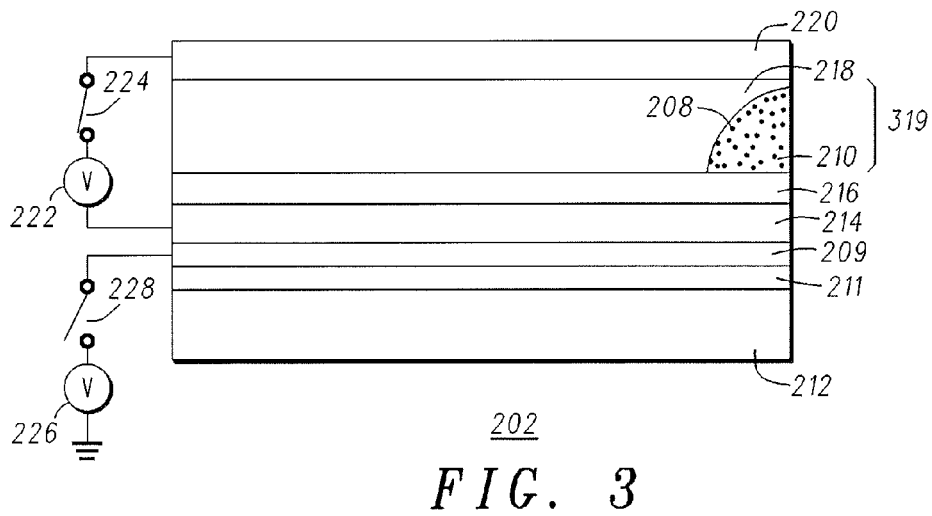
FIG. 3

US 8,264,777 B2

PORTABLE ELECTRONIC DEVICE HAVING AN ELECTRO WETTING DISPLAY ILLUMINATED BY QUANTUM DOTS

FIELD OF THE INVENTION

The present disclosure generally relates to portable electronic devices and more particularly to a portable electronic device having a reflective display that illuminates during low ambient lighting conditions.

BACKGROUND OF THE INVENTION

The market for personal portable electronic devices, for example, cell phones, personal digital assistants (PDA's), digital cameras, and music playback devices (MP3), is very competitive. Manufactures are constantly improving their product with each model in an attempt to cut costs and production requirements.

In many portable electronic devices, such as mobile communication devices, displays present information to a user. For example, electrowetting display technology can display video and text information. This low cost reflective display technology comprising electrowetting light valves, may be used to produce stacked black and white, or colored, shutters over a reflective surface. Typical electrowetting devices use a DC voltage to change the wetting properties between a solid and a liquid, thereby moving the colored oil like a shutter in and out of view. Color electrowetting schemes use absorptive oils of Cyan, Magenta, and Yellow for the highest efficiency subtractive approach. The 'open' condition of the shutter is transparent (not black or white) so that the underlying colors are visible when the first color is "off".

These reflective displays are built above a reflective surface that reflects ambient light through the device to illuminate the oil or lack thereof. When ambient light is insufficient, the displays are difficult to see. Conventional displays have included a backlight that provides a white light vertically through the display and through the oil or lack thereof, to be viewed by the user. However, this backlight requires additional layers adjacent each pixel in the display and several additional process steps in fabrication.

Accordingly, it is desirable to provide a portable electronics device having a self illuminating display that reduces both the thickness of known displays and processing steps in the fabrication thereof. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A portable electronic device having a self illuminating display that reduces both the thickness of known displays and processing steps in the fabrication thereof is provided. The portable electronic device includes an electrowetting display having a plurality of transparent layers defining a cavity. A combination of a first fluid and a second fluid are positioned in the cavity. First circuitry is configured to be coupled to a first voltage source for selectively repositioning the second fluid in relation to the first fluid. A first plurality of quantum dots is positioned within the second fluid, and a light source is disposed contiguous to the plurality of layers. Second circuitry is configured to be coupled to a second voltage source for selectively causing the light source to emit photons to strike the first plurality of quantum dots. Additional similar plurality of layers may be added to provide a color display. A first voltage is selectively applied between first and second electrodes of the electrowetting display to reposition the second fluid in combination with a first fluid, so as to alter the amount of light passing therethrough. A first plurality of photons is selectively applied to cause the plurality of quantum dots in solution with the second fluid to emit photons.

BRIEF DESCRIPTION OF THE DRAWINGS

The present invention will hereinafter be described in conjunction with the following drawing figures, wherein like numerals denote like elements, and FIG. 1 is a schematic partial cross section illustrating a previously known electrowetting display;

FIGS. 2-5 are schematic partial cross sections illustrating four operational states for an exemplary embodiment;

DETAILED DESCRIPTION OF THE INVENTION

Figure 4:
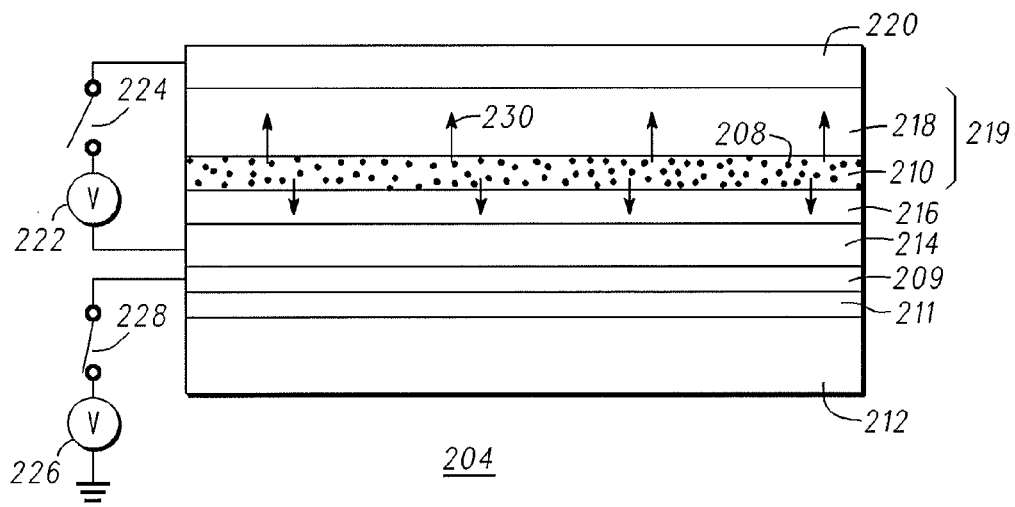

The following detailed description of the invention is merely exemplary in nature and is not intended to limit the invention or the application and uses of the invention. Furthermore, there is no intention to be bound by any theory presented in the preceding background of the invention or the following detailed description of the invention.

A low cost reflective display technology, electrowetting light valves, may be used to produce stacked black and white, or colored, shutters over a reflective surface. Typical electrowetting devices use a DC, or low frequency, voltage to change the wetting properties of a drop of oil in water, thereby moving the colored oil like a shutter in and out of view. Color electrowetting schemes typically use absorptive oils of Cyan, Magenta, and Yellow for the highest efficiency subtractive approach. The 'open' condition of the shutter is transparent (not black or white) so that the underlying colors are visible when the first color is "off".

FIG. 1 is partial cross section of a known electrowetting display 100 of a single stack comprising a reflective material 111 deposited on a substrate 112 and a transparent electrode 114 is formed on the reflective material 111. A transparent hydrophobic insulator 116 is formed on the electrode 114 for supporting the combination of oil 110 and water 118. A transparent electrode 120 is formed above and for containing the water 118 and oil 110 in a cavity 119. A DC/low frequency voltage source 122 is coupled between the electrodes 114 and 120, and is selectively applied by closing the switch 124. When the switch 124 is closed and a voltage is applied across the conductors 114 and 120, the oil 110 moves to the side (not shown) as is known in the industry by being displaced against the transparent hydrophobic insulator 116 by the water 118.

In operation, without voltage applied, the layer of absorptive oil 110 is located in the optical path, and the display looks black. By applying a DC, or low frequency, voltage to the layers (typically <40 V), the oil 110 moves to the side of each cell, eliminating the absorption of the light. Incident light then bounces off the reflective surface 111 and back to the viewer. The amount of displacement of the oil is correlated to the applied voltage. Consequently, different shades (greyscales) are obtained by modulating the applied voltage level. The color is maintained by continual application of applied voltage. However, the leakage current is tremendously small, and shades can be maintained for minutes after the voltage source 122 is disconnected. In the illustrated known display, voltage levels are applied to the display 100 once to set the desired color, and then they are re-applied at intervals (for example, 2 minutes), to refresh the charge.

The exemplary embodiments described herein may be fabricated using known lithographic processes as follows. The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Though various lithography processes, e.g., photolithography, electron beam lithography, and imprint lithography, ink jet printing, may be used to fabricate the light emitting device 200, a printing process is preferred. In the printing process, the Freestanding Quantum Dots (FSQD) ink in liquid form is printed in desired locations on the substrate. Ink compositions typically comprise four elements: 1) functional element, 2) binder, 3) solvent, and 4) additive. Graphic arts inks and functional inks are differentiated by the nature of the functional element, i.e. the emissive quantum dot. The binder, solvent and additives, together, are commonly referred to as the carrier which is formulated for a specific printing technology e.g. tailored rheology. The function of the carrier is the same for graphic arts and printed electronics: dispersion of functional elements, viscosity and surface tension modification, etc. One skilled in the art will appreciate that an expanded color range can be obtained by using more than three quantum dot inks, with each ink having a different mean quantum dot size. A variety of printing techniques, for example, Flexo, Gravure, Screen, inkjet may be used. The Halftone method, for example, allows the full color range to be realized in actual printing.

In accordance with the preferred exemplary embodiment, free standing quantum dots (QDs) are distributed within an oil using a colloidal solution method at a temperature, e.g., of 200 to 350 degrees C. Lithographic methods such as metal organic chemical vapor deposition (MOCVD) and molecular beam epitaxy (MBE) may be used, but require higher temperatures, e.g., 500 to 600 decrees C. The oil is clear (translucent, without color) in one exemplary embodiment, but in another exemplary embodiment may comprise a pigment adding a color. Quantum Dots (QDs), also known as nanocrystals or Freestanding Quantum Dots (FSQD), are semiconductors composed of periodic groups of II-VI, III-V, or IV-VI materials, for example, CdS, CdSe, CdTe, ZnS, ZnSe, ZnTe, GaAs, GaP, GaAs, GaSb, HgS, HgSe, HgTe, InAs, InP, InSb, AlAs, AlP, AlSb. Alternative FSQDs materials that may be used include but are not limited to tertiary microcrystals such as InGaP, which emits in the yellow to red wavelengths (depending on the size) and ZnSeTe, ZnCdS, ZnCdSe, and CdSeS which emits from blue to green wavelengths. Multi-core structures are also possible such as ZnSe/ZnXS/ZnS, are also possible where X represents Ag, Cu, or Mn. The inner most core is made of ZnSe, followed by the second core layer of ZnXS, completed by an external shell made of ZnS.

FSQDs range in size from 2-10 nanometers in diameter (approximately $10^2$-$10^7$ total number of atoms). At these scales, FSQDs have size-tunable band gaps, in other words there spectral emission depends upon size. Whereas, at the bulk scale, emission depends solely on the composition of matter. Other advantages of FSQDs include high photoluminescence quantum efficiencies, good thermal and photo-stability, narrow emission line widths (atom-like spectral emission), and compatibility with solution processing. FSQDs are manufactured conventionally by using colloidal solution chemistry.

FSQDs may be synthesized with a wider band gap outer shell, comprising for example ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AlN, AlP, AlSb. The shell surrounds the core FSQDs and results in a significant increase in the quantum yield. Capping the FSQDs with a shell reduces non-radiative recombination and results in brighter emission. The surface of FSQDs without a shell has both free electrons in addition to crystal defects. Both of these characteristics tend to reduce quantum yield by allowing for non-radiative electron energy transitions at the surface. The addition of a shell reduces the opportunities for these non-radiative transitions by giving conduction band electrons an increased probability of directly relaxing to the valence band. The shell also neutralizes the effects of many types of surface defects. The FSQDs are more thermally stable than organic phosphors since UV light will not chemically breakdown FSQDs. The exterior shell can also serve as an anchor point for chemical bonds that can be used to modify and functionalize the surface.

Due to their small size, typically on the order of 10 nanometers or smaller, the FSQDs have larger band gaps relative to a bulk material. It is noted that the smaller the FSQDs, the higher the band gap. Therefore, when impacted by a photon (emissive electron-hole pair recombination), the smaller the diameter of the FSQDs, the shorter the wavelength of light will be released. Discontinuities and crystal defects on the surface of the FSQD result in non-radiative recombination of the electron-hole pairs that lead to reduced or completely quenched emission of the FSQD. An overcoating shell, e.g., ZnS, having a thickness, e.g., of up to 5 monolayers and higher band gap compared to the core's band gap is optionally provided around the FSQDs core to reduce the surface defects and prevent this lower emission efficiency. The band gap of the shell material should be larger than that of the FSQDs to maintain the energy level of the FSQDs. Capping ligands (molecules) on the outer surface of the shell allow the FSQDs to remain in the colloidal suspension while being grown to the desired size. The FSQDs may then be placed within the display by a printing process, for example. Additionally, a light source (preferably a ultra violet (UV) source) is disposed to selectively provide photons to strike the FSQDs, thereby causing the FSQDs to emit a photon at a frequency comprising the specific color as determined by the size tunable band gap of the FSQDs.

The UV photons are selectively applied across the oil containing the QDs, causing the QDs to emit light. In good lighting conditions, the ambient light reflected through the display may be sufficient for viewing. However, when ambient lighting is insufficient, the UV photons may be applied, e.g., manually by the user or by a sensor, across the oil causing the QDs to provide sufficient light for viewing the information presented thereon. The QDs are excited by the UV photons creating a hole electron pair and released their energy as photons when recombination occurs. A more detailed description follows. This electrowetting technology uses low cost materials and low cost driving methods.

FIGS. 2-5 are schematic diagrams of four states of a single level and a single pixel in which an electrowetting display 200, 202, 204, 206, respectively, includes QDs 208 disposed within an oil 210. Each of the FIGS. 2-5 comprise a reflective surface 211 deposited on a substrate 212. A ultraviolet (UV) light source 209 is disposed on a side of the reflective surface 211 opposed to the substrate 214 and is coupled to a voltage source 226 through switch 228 for selectively activating the UV light source 209. A transparent electrode 214 is formed over the light source 209. A transparent hydrophobic insulator 216 is formed on the electrode 214 for supporting the combination of oil 210 and water 218. A transparent electrode 220 is formed above and for containing the water 218 and oil 210 in a cavity 219. A (low frequency or DC) voltage source 222 is coupled between the electrodes 214 and 220, and is selectively applied by closing the first switch 224.

When ambient lighting is sufficient, the ambient light entering the electrowetting displays 200, 202, 204, 206 is reflected by the reflective surface 211 back out, either through the oil, or not through the oil when the oil has been moved to the side. Note that when the oil contains a color pigment, the light reflected back out will be of that color. The QDs 208 may be activated, e.g., when ambient light is insufficient, to provide additional light exiting the electrowetting displays 200, 202, 204, 206. The QDs 208 will provide a light having a color depending on the diameter of the QDs 208. Preferably, when a colored oil is used, the QDs 208 will provide light of the same frequency (color).

FIG. 2 shows the switches 224 and 228 open, resulting in the oil being dispersed across the hydrophobic insulator 216 and in the QDs 208 being non-emitting. Light exiting this electrowetting display 200 be ambient, and will possess the color of the oil 210, if any.

FIG. 3 shows the switch 224 closed and the switch 228 open, resulting in the oil being pulled to the side of the hydrophobic insulator 216 and the QDs 208 being non-emitting. Light exiting this electrowetting display 202 will be ambient.

FIG. 4 shows the switch 224 open and the switch 228 closed, resulting in the oil being dispersed across the hydrophobic insulator 216 and ultra violet light being directed at the QDs 208, resulting in the QDs 208 emitting photons. Light exiting this electrowetting display 204, will possess the color provided by the combination of the oil 210 and the color provided by the QDs.

Figure 5:
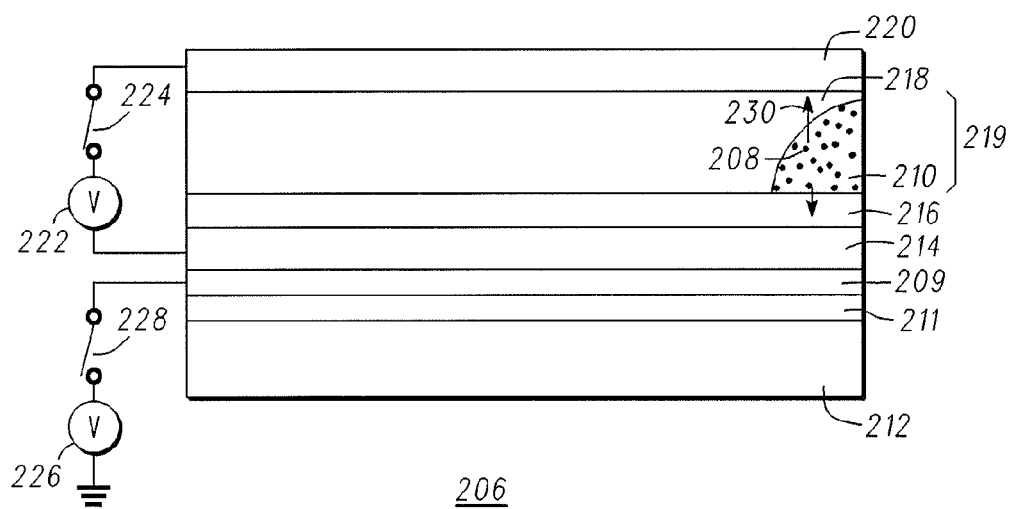

FIG. 5 shows the switches 224 and 228 closed, resulting in the oil 210 being pulled to the side of the hydrophobic insulator 216 and ultra violet light being directed at the QDs 208, resulting in the QDs 208 emitting photons. This state is selected to display the color resulting from photons 230 being emitted from the QDs 208 being mixed with reflected ambient light, if any.

The DC or low frequency voltage from the first voltage source 222 may be varied (by replacing switch 224 with a variable switch, resulting in a variable amount of the oil 210 covering the hydrophobic insulator 216, and therefore, resulting of shades of color in a color display or a gray scale in a black and white display.

Colored electrowetting technology, in preferred embodiments, uses a colored shutter, which allows layers to be stacked to form an efficient reflective surface. The "open shutter" transmissivity may exceed 80 to 90%. Two exemplary embodiments of a color display are described below with reference to FIGS. 6-7.

Figure 6:
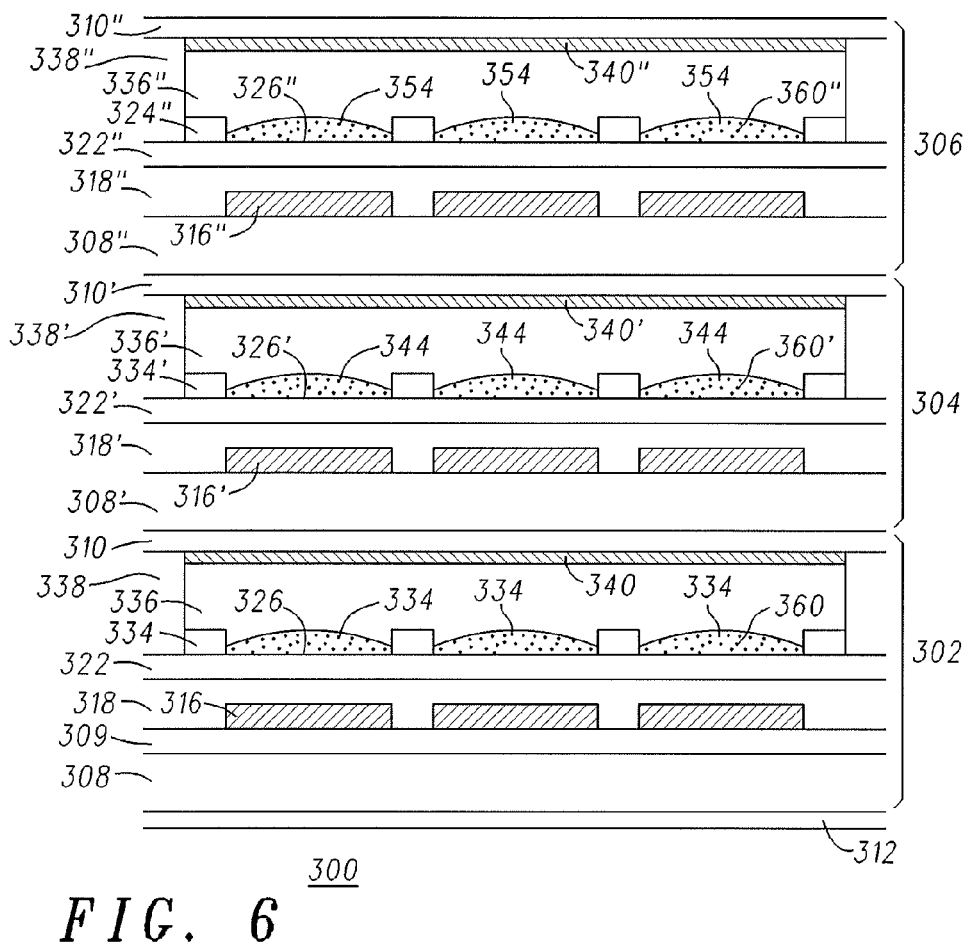
FIG. 6 is a partial cross section of a second exemplary embodiment.

Referring to FIG. 6, a color display 300 comprises three tiers 302, 304, 306. Each tier is an independent color cell, and these tiers 302, 304, 306 are fastened together. One method of fastening is an index-matched optical adhesive. Each tier 302, 304, 306 contains a top substrate 310, 310', 310", respectively, and a bottom substrate 308, 308', 308", respectively. Similar elements are identified with a number in tier 302, a prime of the number in the tier 304, and a double prime in the tier 306. In the preferred embodiment, all six substrate layers 308, 310, 308', 310', 308", 310" are formed of a transparent, sturdy, thin material such as glass, but preferably would comprise a flexible polymer such as polyethylene terephthalate (PET) or polyethylene naphthalate (PEN). A white reflective backplane 312 is positioned at the bottom of the substrate 308. Alternatively, the bottom substrate 308 of tier 302 may be replaced with a compatible white substrate, thereby omitting the bottom layer 312. Additionally, an ultra violet (UV) light source 309 is disposed contiguous to the substrate 308 and is selectively coupled to a voltage source (not shown) as explained with reference to FIGS. 2-5.

The tier 302 comprises transparent conductor 316, for example, indium tin oxide (ITO) or poly-3,4-ethylenedioxthiophene (PEDOT), deposited on substrate 308. An optional insulator material 318 is deposited over the conductor 316 and substrate 308. A layer 322 of a hydrophobic (insulator) film is formed on the optional insulator material 318 (or the oxide 314 and conductor 316). The layer 322 comprises, for example, fluoropolymers, fluorinated inorganic nano-scale particles (e.g. POSS (Polyhedral oligomeric silsesquioxane), and parylene. The hydrophobic layer could also be made with a nano-textured surface sometimes referred to as the "Lotus Effect". In addition, these nano-scale textured surfaces could be chemically functionalized with fluorinated species or fluoropolymers. A hydrophobic material 324 is patterned on the surface 326 of the layer 322 to establish an operating element size. The pattern of the hydrophobic material 324 preferably forms a grid of ribs which creates an array of cells, 332, but may take any form. Although three cells 332 are shown, it should be understood a large plurality of cells 332 may be fabricated. In an embodiment, the grid is formed from polymethyl methacrylate (PMMA) or a photoresist such as epoxy-based SU8 from Microchem. A first oil 334 is placed on the surface 326 of the material 324 within the voids 332. The first oil 334 in one embodiment comprises a mineral oil that is clear, but in other embodiments may include pigments which are soluble in oil, but not water. Example pigments or chromophores include lithol rubine (Red), B: copper thalocyanine (Blue), diarylide yellow (Yellow) at 4 weight percent concentration. The rest of the cell is filled with a fluid that does not mix with oil, for example, water. The fluid 336 may contain surfactants and other elements to extend the temperature range of the fluid, aid manufacturing, and improve oil repulsion. The fluid 336 is placed on the first oil 334 and sealed in place by the combination of the seal 338 and the substrate 310. An electrode 340 comprising a transparent conductive material such as indium tin oxide is formed on the substrate 310 for contacting the fluid 336. In another embodiment, this electrode 340 may be patterned, for example, to include bus lines.

The second tier 304 and third tier 306 are fabricated similar to the first tier 302, with like elements represented by the same number, except those in the second tier 304 are identified with a single prime (') and those in the third tier 306 are identified with a double prime (''). A difference in the tiers 302, 304, 306 is that the second tier 304 comprises a second oil 344 and the third tier 306 comprises a third oil 354. Each of the oils 334, 344, 354 may be clear as discussed herein, or alternatively, the color of the oils 334, 344, 354 in the tiers 302, 304, 306 may be in any order, preferably the first, second, and third oils 334, 344, 354 comprise, respectively, red, green, and blue, or cyan, yellow, and magenta.

QDs 360, 362, 364 are distributed within the oil 334, 344, and 354, respectively. A voltage is applied to the UV light source 309, causing photons to be emitted, striking the QDs 360, 362, 364. Light (photons) are then emitted from the QDs having a predetermined color (frequency) depending on the size of the QDs. The density of the QDs 360, 362, 364 are such that photons from the UV light source 309 will be sufficient to strike the QDs 360, 362, 364 in each of the tiers 202, 204, 206, with some of the UV photons passing through the lower tiers 202, 204 to reach the upper tiers 204, 206. The colors provided by the QDs 360, 362, 364 are disposed such that the longer wavelength colors are closest to the anode, e.g., cathode-red-green-blue-anode. This prevents the photons (red) emitting from the QDs 360 from being absorbed by the QDs 362 that emit green.

For displaying a simple color, an electrical connection is needed between the ground planes in each cell, and for each of the three color layers. The entire display as shown in FIG. 6 functions as three pixels. The display surface may be subdivided into regions with various shapes to permit different areas to display different colors or information. The additional electrical connections require additional interconnects and driving electronics.

In operation, when a desired color and/or pattern (including information such as text) is determined, signals are sent to each tier 302, 304, 306 to move none, one, two, or three of the oils 334, 344, 354. When one of the oils, e.g., 334, is selected to open, the voltage applied across the tier 302 causes the oil and the QDs 360 contained therein to withdraw to a corner of its void 332, allowing the UV light from the light source 309 to bypass the oil 334 and QDs 360. Therefore, by applying the proper signals to each of the tiers 302, 304, 306, the desired color is achieved.

Without voltage applied, three layers of oils and the quantum dots are located in the optical path. By applying a DC, or a low frequency, voltage to the layers (typically <40 V), the colored oil moves to the side of each cell. Incident light then bounces off the backplane and back to the viewer. The amount of displacement of the oil and its quantum dots is correlated to the applied voltage. Consequently, different shades of colors (greyscales) are obtained by modulating the applied voltage level. The color is maintained by continual application of applied voltage.

Figure 7:
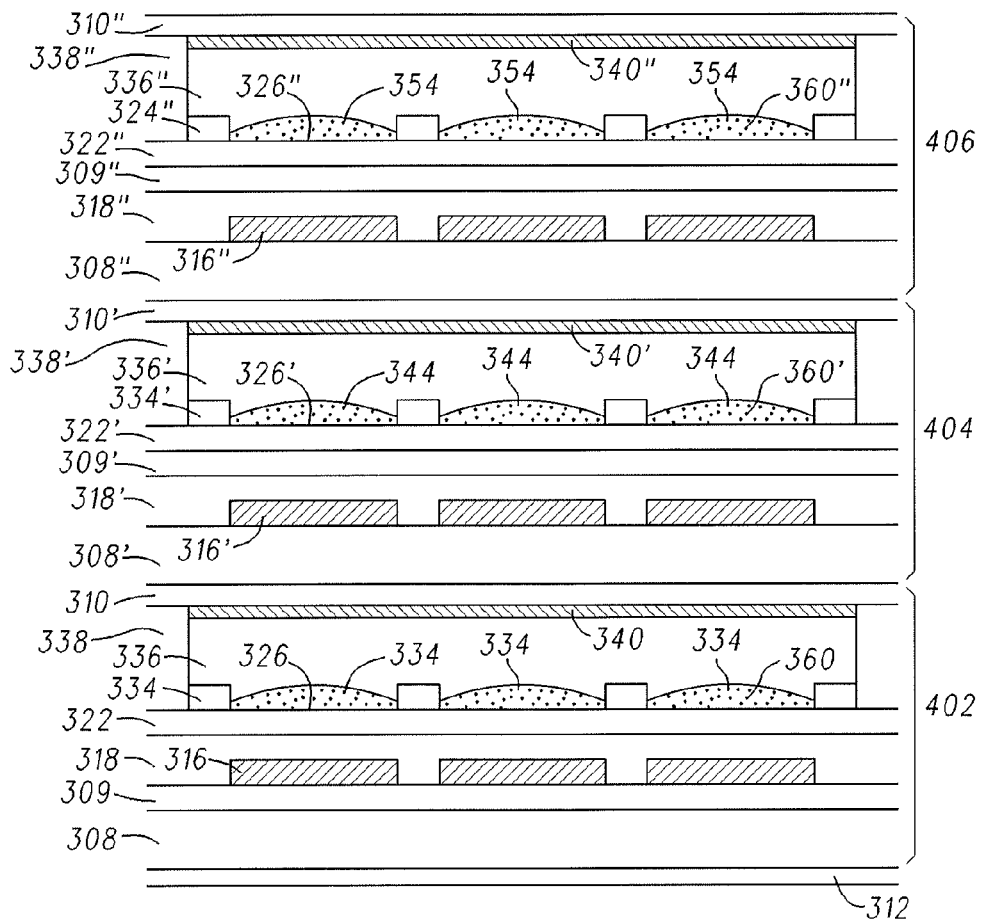
FIG. 7 is a partial cross section of a third exemplary embodiment.

A second exemplary electrowetting technology embodiment of a color display 400 for a portable electronic device 110 is shown in FIG. 7 wherein elements similar to those of FIG. 6 comprise similar material composition. In this second exemplary embodiment, a UV light source 309, 309', 309'' is disposed in each of the three tiers 402, 404, 406 insuring that there is sufficient UV light provided to each of the tiers The UV light sources 309, 309', 309''. The UV light sources 309, 309', 309'' are transparent, thereby allowing light from one of the tiers 402, 404, 406 to pass to another of the tiers 302, 304, 306. In this embodiment, the density of the QDs may be higher. The colors provided by the QDs 360, 362, 364 are disposed such that the longer wavelength colors are closest to the anode, e.g., cathode-red-green-blue-anode. This prevents the photons (red) emitting from the QDs 360 from activating the QDs 362 that emit green.

In any of the embodiments, including the exemplary embodiments described herein, the QDs 360, 360', 360'' may be fabricated to emit light at a desired frequency, thereby imparting a desired color. This color emitted from the QDs 360, 360', 360'' results in that color being emitted from single cell displays such as shown in FIGS. 4-7. This color emitted from the QDs may be combined with the colored light provided by the multiple stacked layers such as shown in FIGS. 8-10.

Figure 8:
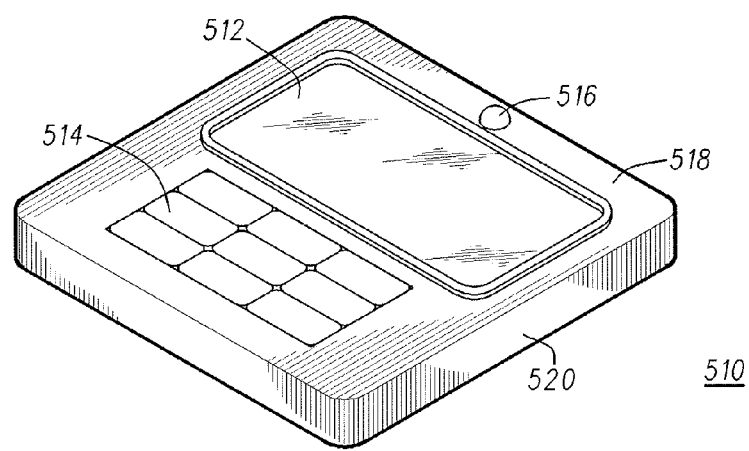
FIG. 8 is a front view of a portable electronic device including a display suitable for use with the exemplary embodiment.

Referring to FIG. 8, a portable electronic device 510 comprises a display 512, a control panel 514, and a speaker 516 encased in a housing 520. Some portable electronic devices 510, e.g., a cell phone, may include other elements such as an antenna, a microphone, and a camera (none shown). In the exemplary embodiments described herein, the display 512 comprises a reflective electrowetting technology. The exemplary embodiment may comprise any type of electronic device, for example, a PDA, a mobile communication device, and gaming devices. Furthermore, while the preferred exemplary embodiment of a portable electronic device is described as a mobile communication device, other embodiments are envisioned, such as flat panel advertising screens, wearable displays, electronic books, embedded displays in smart cards, labels, tickets, electronic shelf labels, and displays for bio-sensor and personal health monitor applications, point of purchase and point of sale posters, mobile device housings or logos, segmented displays, and infrared displays.

Figure 9:
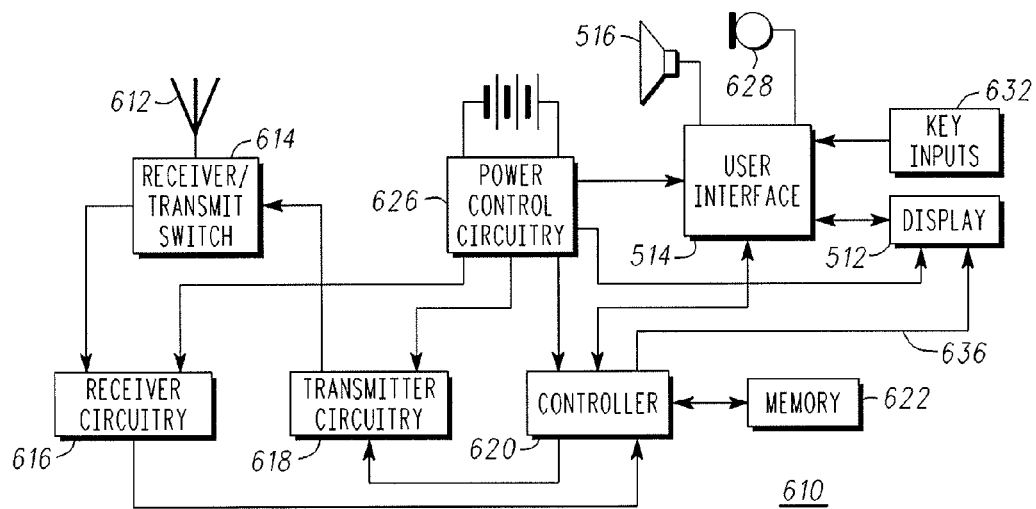
FIG. 9 is a block diagram illustrating circuitry for implementing various exemplary embodiments on the portable electronic device of FIG. 1.

Referring to FIG. 9, a block diagram of a portable electronic device 610 such as a cellular phone, in accordance with the exemplary embodiment is depicted. Though the exemplary embodiment is a cellular phone, the display described herein may be used with any electronic device in which information, colors, or patterns are to be presented. The portable electronic device 610 includes an antenna 612 for receiving and transmitting radio frequency (RF) signals. A receive/transmit switch 614 selectively couples the antenna 612 to receiver circuitry 616 and transmitter circuitry 618 in a manner familiar to those skilled in the art. The receiver circuitry 616 demodulates and decodes the RF signals to derive information therefrom and is coupled to a controller 620 for providing the decoded information thereto for utilization thereby in accordance with the function(s) of the portable communication device 610. The controller 620 also provides information to the transmitter circuitry 618 for encoding and modulating information into RF signals for transmission from the antenna 612. As is well-known in the art, the controller 620 is typically coupled to a memory device 622 and a user interface 114 to perform the functions of the portable electronic device 610. Power control circuitry 626 is coupled to the components of the portable communication device 610, such as the controller 620, the receiver circuitry 616, the transmitter circuitry 618 and/or the user interface 114, to provide appropriate operational voltage and current to those components. The user interface 114 includes a microphone 628, a speaker 116 and one or more key inputs 632, including a keypad. The user interface 114 may also include a display 112 which could include touch screen inputs. The display 112 is coupled to the controller 620 by the conductor 636 for selective application of voltages in some of the exemplary embodiments described below.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An electrowetting display, comprising:
 a plurality of transparent layers defining a cavity;
 a combination of a first fluid and a second fluid positioned in the cavity;
 first circuitry configured to be coupled to a first voltage source for selectively repositioning the second fluid in relation to the first fluid;
 a first plurality of quantum dots positioned within the second fluid;
 a light source disposed contiguous to the plurality of layers; and
 second circuitry configured to be coupled to a second voltage source for selectively causing the light source to emit photons to strike the first plurality of quantum dots.

2. The electrowetting display of claim 1 wherein the plurality of layers comprise:
 a first conductive layer;
 a first transparent hydrophobic material formed over the first conductive layer;
 a first transparent material formed over the first transparent hydrophobic material to define the first cavity; and
 a first transparent conductor formed on the first transparent material;
 wherein the first voltage source is selectively coupled between the first conductive layer and the first transparent conductor.

3. The electrowetting display of claim 2 further comprising a reflective layer disposed contiguous to the first conductive layer.

4. The electrowetting display of claim 2 wherein the first conductive layer comprises a reflective layer.

5. The electrowetting display of claim 2 further comprising:
 a second reflective conductive layer formed over the first transparent conductor;
 a second transparent hydrophobic material formed over the second reflective conductive layer;
 a second transparent material formed over the second transparent hydrophobic material to define a second cavity;
 a third fluid placed in the cavity, the third fluid having a disaffinity for the transparent hydrophobic material;
 a fourth fluid placed in the cavity;
 a second plurality of quantum dots formed in the fourth fluid; and
 a second transparent conductor formed on the second transparent material;
 wherein the first voltage source is selectively coupled between the second conductive layer and the second transparent conductor, and the second circuitry selectively causes the light source to emit photons to strike the second plurality of quantum dots;
 a third reflective conductive layer formed over the second transparent conductor;
 a third transparent hydrophobic material formed over the third reflective conductive layer;
 a third transparent material formed over the third transparent hydrophobic material to define a third cavity;
 a fifth fluid placed in the cavity, the fifth fluid having a disaffinity for the transparent hydrophobic material;
 a sixth fluid placed in the cavity;
 a third plurality of quantum dots formed in the sixth fluid; and
 a third transparent conductor formed on the third transparent material;
 wherein the first voltage source is selectively coupled between the third conductive layer and the third transparent conductor, and the second circuitry selectively causes the light source to emit photons to strike the third plurality of quantum dots.

6. The electrowetting display of claim 5 wherein each of the first, second, and third quantum dots exclusively comprise a material that emit photons having a first, second, and third frequency, respectively.

7. The electrowetting display of claim 6 wherein the second, fourth, and sixth fluids comprise first, second, and third colors, respectively.

8. The electrowetting display of claim 1 wherein the first fluid has a disaffinity for the first transparent hydrophobic material and the second fluid comprises a first oil.

9. The electrowetting display of claim 1 further comprising electronics coupled to select the first and second circuitry.

10. The electrowetting display of claim 9 wherein the electronics comprises a cellular telephone.

11. An electronic device display comprising:
 a first plurality of layers comprising:
  a first conductive layer;
  a first transparent hydrophobic material formed over the first reflective conductive layer;
  a first transparent material formed over the first transparent hydrophobic material to define a first cavity;
  a first fluid disposed in the first cavity, the first fluid having a disaffinity for the transparent hydrophobic material;
  a first oil disposed in the first cavity;
  a first plurality of quantum dots disposed in the first oil; and
  a first transparent conductor formed on the first transparent material; and
 a light source positioned contiguous to the first plurality of layers,
 wherein the first conductive layer and the first transparent conductor are configured to be selectively coupled to a first voltage source.

12. The electronic device display of claim 11 further comprising a reflective layer disposed contiguous to the first conductive layer.

13. The electronic device display of claim 11 wherein the first conductive layer comprises a reflective layer.

14. The electrowetting display of claim 13 wherein the circuitry comprises a mobile communication device.

15. The electronic device display of claim 11 further comprising electronics for selecting the first voltage sources.

16. The electronic device display of claim 11 wherein the electronics comprises a mobile communication device.

17. The electronic device of claim 11 further comprising:
a second plurality of layers for selectively reflecting a second color, comprising:
  a second conductive layer;
  a second transparent hydrophobic material formed over the second conductive layer;
  a second transparent material formed over the second transparent hydrophobic material to define a second cavity;
  the first fluid disposed in the second cavity;
  a second oil disposed in the second cavity;
  a second plurality of quantum dots disposed in the second oil; and
  a second transparent conductor formed on the second transparent material;
wherein the second conductive layer and the second transparent conductor are configured to be selectively coupled to the first voltage source;
a third plurality of layers for selectively reflecting a third color, comprising:
  a third conductive layer;
  a third transparent hydrophobic material formed over the third conductive layer;
  a third transparent material formed over the third transparent hydrophobic material to define a third cavity;
  the first fluid disposed in the third cavity;
  a third oil disposed in the third cavity;
  a third plurality of quantum dots disposed in the third oil; and
  a third transparent conductor formed on the third transparent material;
wherein the second conductive layer and the second transparent conductor are configured to be selectively coupled to the first voltage source.

18. A method comprising:
selectively applying a first voltage between first and second electrodes of an electrowetting display to reposition a first material in combination with a second material, the combination disposed between the first and second electrodes so as to alter the amount of light passing therethrough; and
selectively applying a first plurality of photons to cause a first plurality of quantum dots in solution with the first material to emit photons.

19. The method of claim 18 wherein the first material imparts a color to the light and applying the first voltage at least partially removes the colored light from the display.

20. The method of claim 18 wherein the photons are absorbed within the first plurality of quantum dots and other photons having a different frequency are emitted from the quantum dots.

21. The method of claim 18 wherein the first material is oil and the second material is water.

22. The method of claim 21 further comprising:
selectively applying the first voltage between third and fourth electrodes of the electrowetting display to reposition a third material in combination with the second material disposed between the third and fourth electrodes so as to alter the amount of light passing therethrough;
selectively applying the first plurality of photons to cause a second plurality of quantum dots in solution with the third material to emit photons;
selectively applying the first voltage between fifth and sixth electrodes of the electrowetting display to reposition a fourth material in combination with the second material positioned between the fifth and sixth electrodes so as to alter the amount of light passing therethrough; and
selectively applying the first plurality of photons to cause a third plurality of quantum dots in solution with the fourth material to emit photons.

23. The method of claim 22 wherein the first, third, and fourth material is oil and the second material is water.

* * * * *